(12) United States Patent
Hirokawa et al.

(10) Patent No.: US 7,954,456 B2
(45) Date of Patent: Jun. 7, 2011

(54) FREESTANDING PET BARRIER

(75) Inventors: Satoshi Hirokawa, Toyama (JP); Orie Tani, Toyama (JP)

(73) Assignee: Richell U.S.A., Inc., Grand Prairie, TX (US)

( * ) Notice: Subject to any disclaimer, the term of this patent is extended or adjusted under 35 U.S.C. 154(b) by 0 days.

(21) Appl. No.: 12/786,422

(22) Filed: May 24, 2010

(65) Prior Publication Data

US 2010/0282178 A1 Nov. 11, 2010

Related U.S. Application Data

(63) Continuation of application No. 12/367,402, filed on Feb. 6, 2009, now Pat. No. 7,739,983, and a continuation of application No. 11/280,790, filed on Nov. 16, 2005, now Pat. No. 7,568,449.

(30) Foreign Application Priority Data

Nov. 24, 2004 (JP) ................................ 2004-338416

(51) Int. Cl.
*A01K 1/03* (2006.01)
*E06B 3/66* (2006.01)
*E06B 7/00* (2006.01)
*E06B 9/01* (2006.01)

(52) U.S. Cl. ............................................ 119/452; 49/55
(58) Field of Classification Search .................. 119/452, 119/484, 705, 712; 49/50, 55, 57; D6/331, D6/332, 391; 256/65.01, 65.11, 65.12, 65.13, 256/73, 24, 25, 64
See application file for complete search history.

(56) References Cited

U.S. PATENT DOCUMENTS

| | | | |
|---|---|---|---|
| 1,170,794 A | 2/1916 | Barnes | |
| 1,799,308 A | 4/1931 | Matthiesen et al. | |
| 2,610,830 A | 9/1952 | George | |
| 2,736,041 A | 2/1956 | Maloof | |
| 3,002,493 A | 10/1961 | Galamba | |
| 3,204,606 A | 9/1965 | Parr et al. | |
| 4,062,322 A | 12/1977 | Dormehl | |
| 4,073,478 A | 2/1978 | Bermudez | |
| 4,777,765 A | 10/1988 | Johnson, Jr. | |
| 5,058,863 A | 10/1991 | Maffet | |

(Continued)

FOREIGN PATENT DOCUMENTS

JP 48-29652 9/1973

(Continued)

OTHER PUBLICATIONS

Office Action dated May 30, 2008, U.S. Appl. No. 11/280,790, 24 pages.

(Continued)

*Primary Examiner* — Timothy D Collins
*Assistant Examiner* — Monica Williams
(74) *Attorney, Agent, or Firm* — Conley Rose, P.C.

(57) ABSTRACT

A self-supporting pet barrier comprising a front panel and two side panels, each panel having floor-contacting surfaces preferably to which a friction reducing substance has been applied is disclosed. The front and side panels preferably are attached so that the side panels can be positioned from generally perpendicularly to the front panel in use to a folded position adjacent said front panel for storage or travel. A generally triangular stabilizing leg may protrude forward from the plane of the front panel and can be attached in either the side panel or front panel.

20 Claims, 10 Drawing Sheets

U.S. PATENT DOCUMENTS

| | | | |
|---|---|---|---|
| 5,081,723 A | 1/1992 | Saunders | |
| 5,117,585 A * | 6/1992 | Andrisin, III | 49/55 |
| 5,170,746 A | 12/1992 | Roose | |
| 5,282,606 A | 2/1994 | Praiss | |
| 5,544,870 A | 8/1996 | Kelley et al. | |
| 5,782,039 A | 7/1998 | Scherer et al. | |
| 5,927,694 A * | 7/1999 | Montepiano | 256/64 |
| 5,993,103 A * | 11/1999 | Christensen | 404/6 |
| 6,112,461 A | 9/2000 | Cheng | |
| 6,123,321 A | 9/2000 | Miller | |
| 6,161,334 A | 12/2000 | Goodin | |
| 6,553,940 B1 | 4/2003 | Powell et al. | |
| 6,581,914 B2 | 6/2003 | Saura Sotillos et al. | |
| 6,681,523 B1 | 1/2004 | Stener | |
| 6,854,426 B2 | 2/2005 | Campbell et al. | |
| 6,945,518 B1 | 9/2005 | Chrysler | |
| 7,234,275 B1 | 6/2007 | Haggy et al. | |
| D579,609 S | 10/2008 | Hirokawa et al. | |
| 7,568,449 B2 | 8/2009 | Hirokawa et al. | |
| 7,739,983 B2 | 6/2010 | Hirokawa et al. | |
| 2001/0011406 A1 | 8/2001 | Nakamoto et al. | |
| 2003/0209208 A1 | 11/2003 | Campbell et al. | |
| 2004/0188667 A1 | 9/2004 | Ray et al. | |
| 2004/0206947 A1 | 10/2004 | Rosaen | |
| 2004/0206948 A1 | 10/2004 | Lappen | |
| 2008/0011994 A1 | 1/2008 | Howe et al. | |
| 2008/0141450 A1 | 6/2008 | Pesta | |
| 2008/0185566 A1 | 8/2008 | Flannery | |
| 2008/0236502 A1 | 10/2008 | Elias et al. | |
| 2009/0178624 A1 | 7/2009 | Hirokawa et al. | |

FOREIGN PATENT DOCUMENTS

| | | |
|---|---|---|
| JP | 54-98754 | 7/1979 |
| JP | 1991-3237 | 1/1991 |
| JP | 1991-48555 | 5/1991 |
| JP | 06071625 | 10/1994 |
| JP | 929649 | 7/1995 |
| JP | 07173891 | 7/1995 |
| JP | 07285775 | 10/1995 |
| JP | 1087801 | 10/2000 |
| JP | 1087802 | 10/2000 |
| JP | 1087937 | 10/2000 |
| JP | 3076305 | 1/2001 |
| JP | 2001008604 | 1/2001 |
| JP | 3078066 | 3/2001 |
| JP | 1122773 | 10/2001 |
| JP | 2002021376 | 1/2002 |
| JP | 1137270 | 3/2002 |
| JP | 2002088953 | 3/2002 |
| JP | 2002302355 | 10/2002 |
| JP | 1169549 | 4/2003 |
| JP | 1169773 | 4/2003 |
| JP | 1170082 | 4/2003 |
| JP | 3467626 | 5/2003 |
| JP | 1174314 | 6/2003 |
| JP | 2004242649 | 9/2004 |
| JP | 2004324333 | 11/2004 |
| JP | 3821299 | 6/2006 |
| JP | 4007515 | 9/2007 |
| JP | 4197510 | 10/2008 |
| JP | 4212001 | 11/2008 |

OTHER PUBLICATIONS

Notice of Allowance dated Nov. 18, 2008, U.S. Appl. No. 11/280,790, 11 pages.
Supplemental Notice of Allowance dated Jun. 10, 2009, U.S. Appl. No. 11/280,790, 4 pages.
Office Action dated Sep. 23, 2009, U.S. Appl. No. 12/367,402, 12 pages.
Notice of Allowance dated Feb. 23, 2010, U.S. Appl. No. 12/367,402, 6 pages.
Richell Corporation, Pet Sitter Gate Picture Taken From Sales Catalog, 2003-2004, Issued in Feb. 2003.
Patent Abstract and Partial Translation, JP07-173891.
Patent Abstract and Partial Translation, JP07285775.
Patent Abstract and Partial Translation, JP2001-008604.
Patent Abstract and Machine Translation, JP2004-242649.
Partial Translation, JP3467626.
Patent Abstract and Machine Translation, JP48-29652.
Patent Abstract and Machine Translation, JP54-98754.
Hirokawa, Satishi, et al., Patent application entitled "Freestanding Pet Barrier," filed Feb. 6, 2009 as U.S. Appl. No. 12/367,402.
Office Action dated Jun. 22, 2010, U.S. Appl. No. 11/938,780.
Final Office Action dated Dec. 6, 2010, U.S. Appl. No. 11/938,780.
Amendments dated Nov. 13, 2007, Application No. JP2004-338416.
Petition dated Nov. 13, 2007, Application No. JP2004-338416.
Notification of Office Action dated Aug. 19, 2008, Application No. JP2004-338416.
Amendments dated Aug. 29, 2008, Application No. JP2004-338416.
Response to Office Action dated Aug. 29, 2008, Application No. JP2004-338416.
Amendments dated May 17, 2006, Application No. JP2006-122774.
Detailed Explanations in regard to Accelerated Examination dated May 17, 2006, Application No. JP2006-122774.
Amendments dated Aug. 1, 2007, Application No. JP2007-200385.
Detailed Explanations in regard to Accelerated Examination dated Aug. 1, 2007, Application No. JP2007-200385.
Amendments dated Jun. 30, 2008, Application No. JP2008-169750.
Detailed Explanations in regard to Accelerated Examination dated Jun. 30, 2008, Application No. JP2008-169750.
Notification of Office Action dated Aug. 18, 2008, Application No. JP2008-169750.
Amendments dated Sep. 29, 2008, Application No. JP2008-169750.
Response to Office Action dated Sep. 29, 2008, Application No. JP2008-169750.
Kobayashi, Terutoki, et al., Patent application entitled "Pet Barrier," filed Nov. 12, 2007 as U.S. Appl. No. 11/938,780.
Amendments dated Jun. 30, 2008, Application No. JP2004-33416.

* cited by examiner

FREESTANDING PET BARRIER

This application is a continuation of and claims priority to U.S. patent application Ser. No. 12/367,402, entitled "Freestanding Pet Barrier," filed on Feb. 6, 2009, which is a continuation of U.S. Pat. No. 7,568,449, entitled "Freestanding Pet Barrier," issued on Aug. 4, 2009, which claims priority under 35 U.S.C. §119 to Patent Application Serial No. 2004-338416, entitled "Freestanding Pet Gate," filed with the Japan Patent Office on Nov. 24, 2004, under the Paris Convention for the Protection of Industrial Property, all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not Applicable.

FIELD OF THE INVENTION

The present invention relates to a temporary indoor barrier which prevents pets from entering designated areas of the home.

BACKGROUND OF THE INVENTION

When keeping pets indoor, there are often areas from which it is desired to restrict access by pets such as, for example, a kitchen, entry area, or other room.

Indoor barriers or fences to prevent pets from entering such areas have been reported.

In general, an indoor fence has a mounting section that can be attached to and detached from a pillar or wall. By attaching the mounting section to a pillar or wall that is opposite another pillar or wall, it is possible to block the space between such pillars or walls with the fence. An indoor pet fence has been reported in Published Unexamined Japanese Patent Application No. 2002-21376 that also has a gate that can be opened and closed with one hand.

However, an indoor pet fence such as described in Japanese Patent Application 2002-21376 is in contact with, and compressed between two walls or pillars. Accordingly, without pillars or walls that support contact with the fence on both sides thereof, the fence cannot be installed. Therefore, the fence cannot be installed in such a location as at the foot of a staircase, because of the absence of opposing pillars or walls and a problem remains as to how to secure such areas from pet entry.

In addition, because a fence is compressed between opposing walls or pillars it is not easy to remove it once it has been installed. However, it might be necessary to remove it to allow people to pass from one area to another. This operation is cumbersome.

As stated above, the indoor pet fence such as described in Japanese Patent Application 2002-21376 is cumbersome to attach or detach.

A self-supporting freestanding pet barrier is herein disclosed which has features that facilitate installation and removal, as well as the passage of human traffic when desired

DETAILED DESCRIPTION OF THE INVENTION

Figure 1:
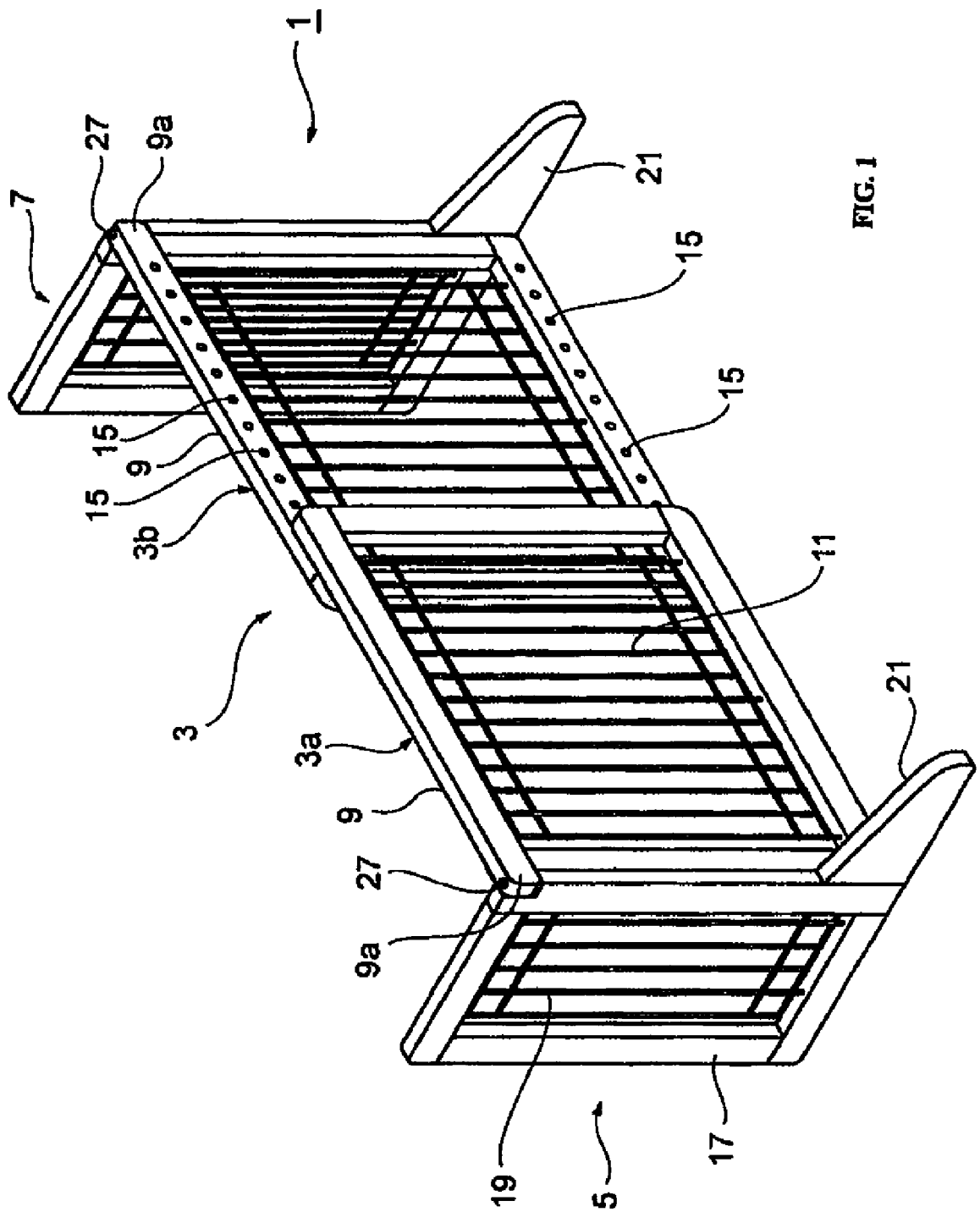
FIG. 1 is a perspective view, viewed from the front, of a freestanding pet barrier according to an embodiment of the present invention.

For a more complete understanding of the present disclosure and the advantages thereof, reference is now made to the following description, taken in connection with the accompanying drawings and detailed description, wherein like reference numerals represent like parts.

One embodiment of a freestanding pet barrier according to the present invention comprises a front panel having two vertical members and side panels attached to each of said vertical members of said front panel. In a preferred embodiment, the side panels are extended in the direction that intersects with the front panel to enable a self-supporting structure.

In examples in which the side panels are extended in the direction that intersects with the front panel to enable a self-supporting structure, the front panel and the side panels are generally located in a configuration resembling the letter-U or the letter-H when viewed in a plan view. Furthermore, the front panel and the side panels may be located in a configuration resembling the letter-U, and a support member may extend outwardly from the front panel opposite to the direction of the side panels.

The front panel described above can extend and contract in the direction of the width. Specifically, to enable the front panel to extend and contract, for example, the front panel comprises a plurality of panels which are positioned so that they overlap with each other in the anteroposterior direction and the total width of the panel can be adjusted by adjusting the length of the overlapping.

The side panels described above can be folded.

The freestanding pet barrier of the invention may comprise one or more stabilizing means as will be further described below that serve to enable the freestanding configuration or lock the desired configuration.

Furthermore, a freestanding pet barrier having the foldable side panels preferably comprises a coupling section which rotatably couples the side panel with the front panel, and a stopper which restricts rotation of the side panel when the side panel is unfolded. A specific example of the stopper is a mechanism in which (when the side panel is unfolded) a pin passes through both the side panel and the front panel via a thin hole provided on both the side panel and the front panel.

A freestanding pet barrier disclosed herein preferably has a friction reducing member or substance provided on the bottom face of the front panel and the bottom face of the side panel to prevent those panels from slipping.

Preferably, both the front panel and the side panels can be disassembled. In this embodiment, because the front panel and the side panel can be separated from each other, it is possible to quickly disassemble the freestanding pet barrier when it is stored, thereby enabling compact storage.

In a preferred embodiment, the front panel comprises a frame with wires installed in the frame, and only vertical wires are installed in the central three-fifths portion of the front panel. This construction prevents a pet from climbing onto or over the freestanding pet barrier, since it cannot boost itself by putting its feet on the vertical wires. As a result, there is no danger of the pet climbing over the freestanding pet barrier.

In a preferred embodiment, the front panel described above is of the proper height so that a person can step over the panel. When a person approaches, he or she can simply step over the front panel without needing to open and close the gates, thereby providing convenience to the user.

It is preferable in this embodiment that the front panel be set less than 65 cm high, and most preferably between 50 cm and 65 cm high in order for a person to step over it.

In another embodiment, the front panel described above has a small gate built into the front panel to allow a pet to pass through the freestanding pet barrier.

The small gate enables a pet to pass through the installed freestanding pet barrier, thereby allowing or preventing a pet from passing through to the other side of the freestanding pet barrier as necessary or desired.

In yet another embodiment, the front panel described above has a gate to allow a person to open and close it when he or she passes through the gate.

In this embodiment, because the front panel has a gate which a person can open and close when he or she goes through it, the person can pass through the panel even when it is too high to step over, thereby making it possible for a child or a physically impaired person who cannot step over the panel to pass through the freestanding pet barrier.

In a most preferred embodiment, an indoor freestanding pet barrier according to the present invention comprises a front panel and side panels attached to both sides of the front panel, wherein the side panels are extended in the direction that intersects with the front panel to enable a self-supporting structure. Accordingly, the self-supporting structure allows the freestanding pet barrier to be installed in any location.

Furthermore, since side panels are provided, it is possible to prevent a pet from entering from the direction of the sides of the front panel. That is, the side panels are not simply help the front panel to become self-supporting, but reliably prevent a pet from entering from the direction of the sides of the front panel.

Figure 2:
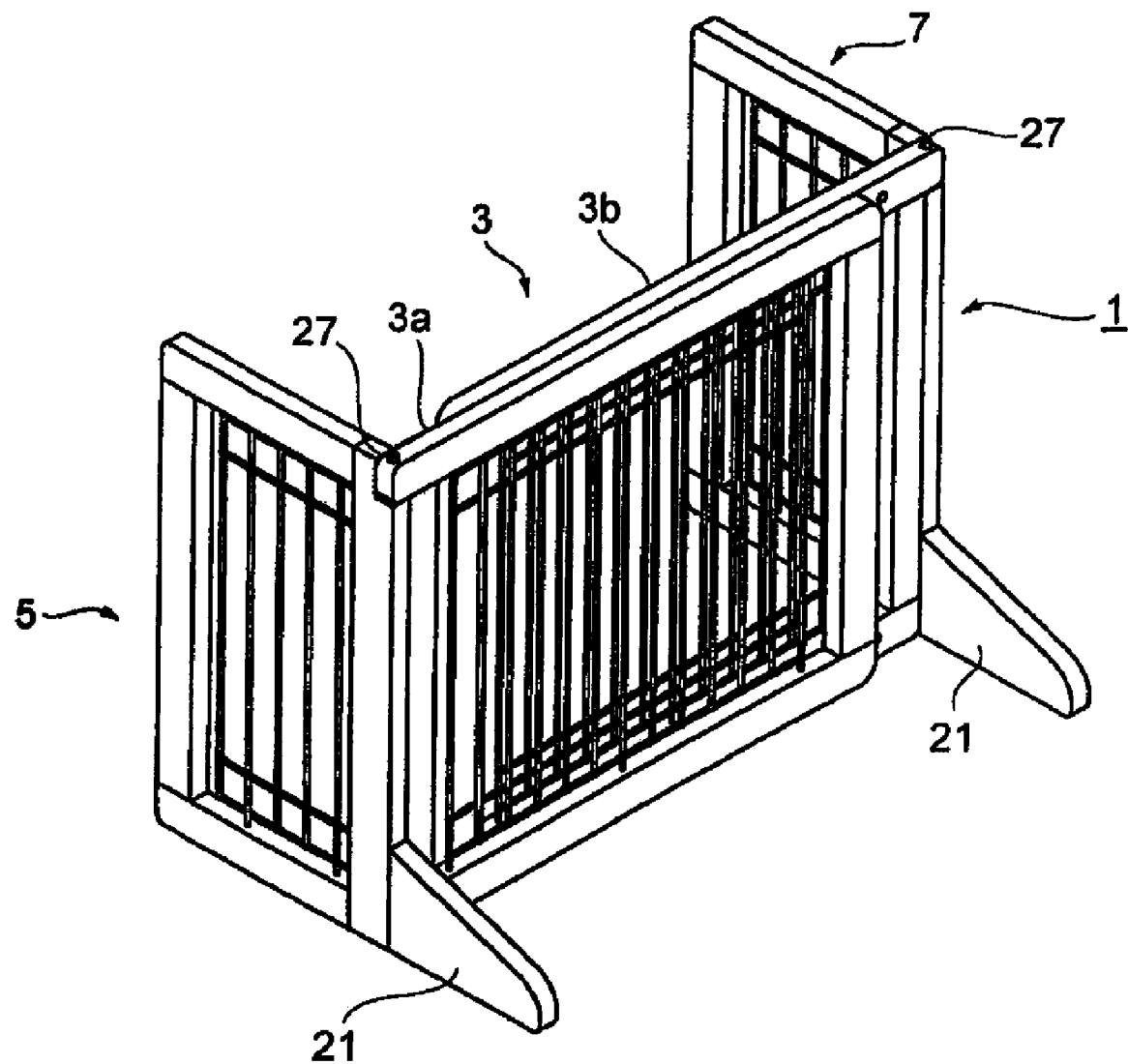
FIG. 2 is also a perspective view, viewed from the front, of a freestanding pet barrier according to an embodiment of the present invention, wherein the width of the front panel has been narrowed.
Figure 3:
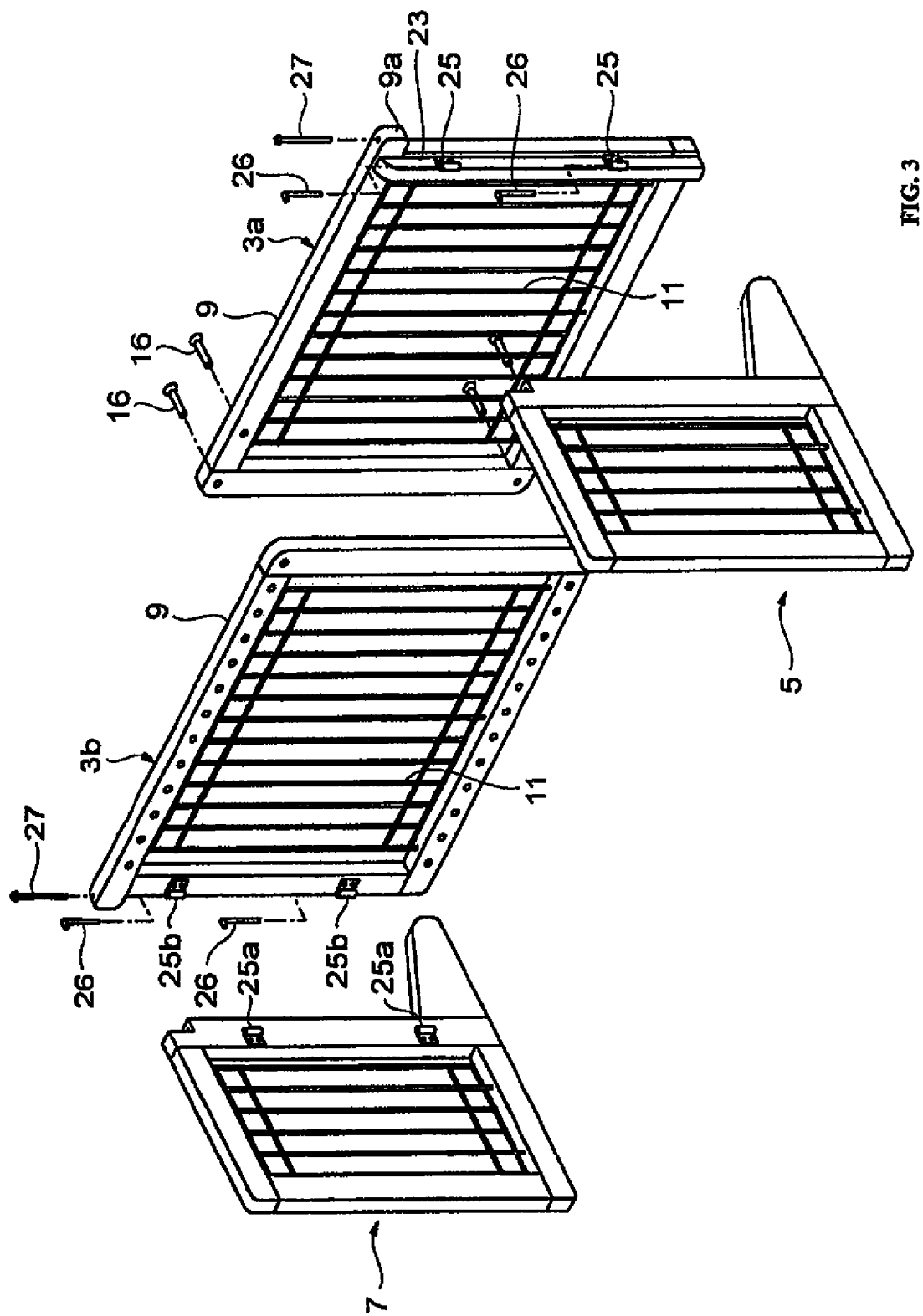
FIG. 3 is an exploded perspective view of a freestanding pet barrier according to one embodiment of the present invention.
Figure 4:
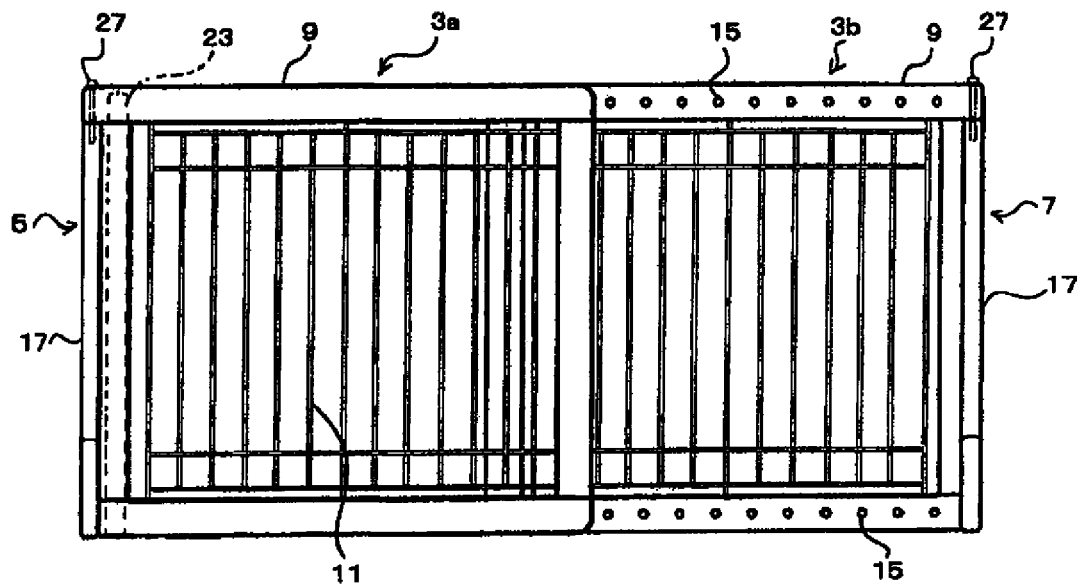
FIG. 4 is a front view of a freestanding pet barrier according to one embodiment of the present invention.

As shown in FIG. 1 through FIG. 3, a freestanding pet barrier 1 according to this embodiment comprises a front panel 3 and a pair of side panels 5 and 7 which are attached to the sides of the front panel 3 so that they can be folded and removed. Hereafter, each component will be explained in detail with reference to the drawings.

The front panel 3 comprises two panels 3a and 3b. The basic structure of the panels 3a and 3b is the same, therefore, the panel 3a will be described below and the same reference number is assigned to the identical portion of the panel 3b.

The panel 3a comprises a rectangular frame 9 which is of the proper height to control the entry of a pet and enable a person to step over it, and wires 11 installed in the frame (see FIG. 1 through FIG. 4). It is preferable that the height of the panel be 65 cm or less and more preferably set between 50 cm and 65 cm.

An extending section 9a which extends laterally by the length equivalent to the thickness of the side panel 3 is provided on an end of the upper horizontal member of the frame 9 (see FIG. 1).

Wires 11 are mainly installed vertically, and a horizontal wire is installed in an upper location as well as in a lower location of the frame 9. That is, the central three-fifths portion of the front panel is made up of only vertical wires. This prevents an indoor pet from climbing the freestanding pet barrier by obtaining a foothold on the wires.

Figure 5:
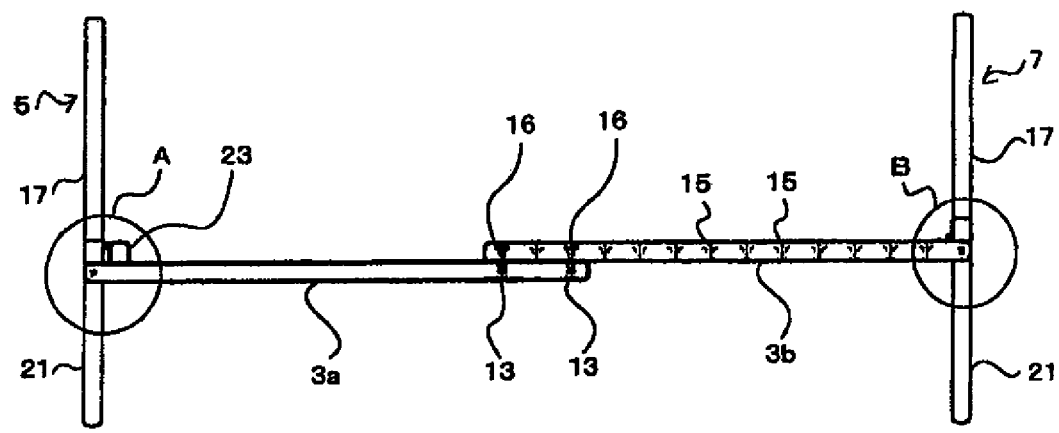
FIG. 5 is a plan view of a freestanding pet barrier according to one embodiment of the present invention.

As shown in FIG. 1 and FIG. 5, two panels 3a and 3b are located so that they partially overlap in the anteroposterior direction. The total width of the front panel can be adjusted by adjusting the length of the portion where the two panels 3a and 3b overlap in the anteroposterior direction.

Two positioning insertion nuts 13 are provided in each end of the upper and lower horizontal members that constitute the frame 9 of the anteriorly located panel 3a. See FIG. 3 and FIG. 5. Furthermore, a plurality of positioning holes 15 are provided in both the upper and lower horizontal members that constitute the frame 9 of the posteriorly located panel 3b. An interval between a plurality of positioning holes 15 provided in the posteriorly located panel 3b is half of the interval between the two positioning insertion nuts 13 provided in the anteriorly located panel 3a.

The two panels 3a and 3b partially overlap, and so that the positioning holes 15 of the posteriorly located panel 3b, are aligned with the insertion nuts 13 of the anteriorly located panel 3a so that a bolt 16 can pass through the insertion nuts 13 and the positioning holes 15 from the rear of the panel 3b, thereby making it possible to securely fix the two panels 3a and 3b in a prescribed location and adjust the width of the front panel 3 (see FIG. 3 and FIG. 5). Providing the two insertion nuts in the anteriorly located panel 3a makes it possible to securely couple the two panels. Furthermore, because the interval between two insertion nuts 13 provided in the anteriorly located panel 3a is of sufficient dimension, if a force in the anteroposterior direction is applied to the front panel 3, resistance will increase. On the other hand, an interval between positioning holes 15 provided in the posteriorly located panel 3b is about half of the interval between the insertion nuts 13 of the anteriorly located panel 3a, which makes it possible to make fine adjustments of the width.

The basic structure of the two side panels 5 and 7 that are attached to the sides of the front panel 3 is the same, therefore, only the side panel 5 will be described below.

Figure 7:
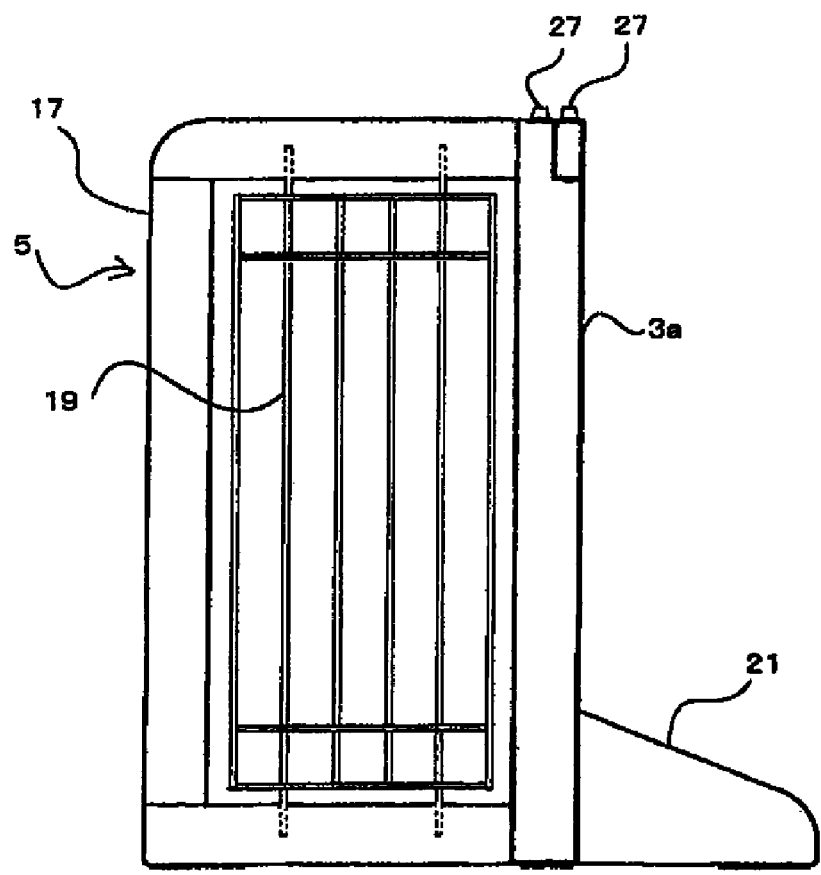
FIG. 7 is a left side view of a freestanding pet barrier according to one embodiment of the present invention.
Figure 8:
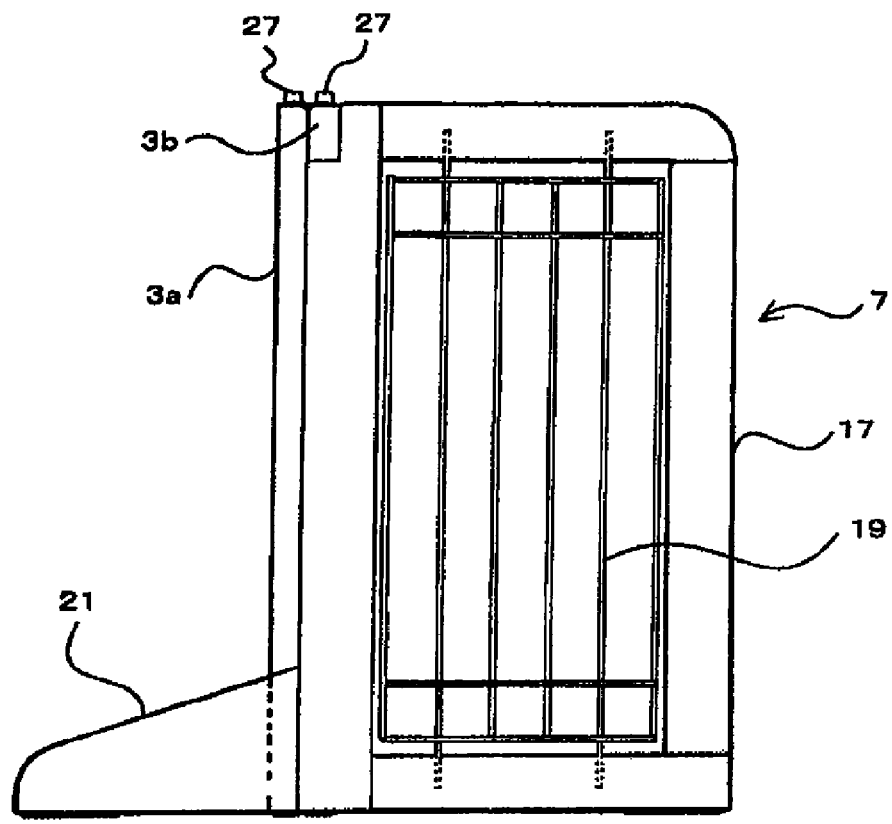
FIG. 8 is a right side view of a freestanding pet barrier according to one embodiment of the present invention.

As shown in FIG. 7, the side panel 5 comprises a nearly rectangular frame 17 and wires 19 that are installed in the frame 17. In the same manner as the front panel 3, wires 19 are mainly installed vertically, and a horizontal wire is installed in an upper location as well as in a lower location of the frame 17. That is, the central three-fifths portion of the side panel 5 is made up of only vertical wires.

A generally triangular leg 21 is provided at the lower part of the side panel 5. The leg 21 protrudes forward from the front panel 3 when a freestanding pet barrier 1 is installed. Providing the leg 21 increases stability when the indoor freestanding pet barrier 1 stands alone.

The side panel 5 is mounted to the front panel so that the side panel 5 can be folded. Specifically, the side panel 5 and the front panel 3a are rotatably connected by the hinges 25 that are provided at the upper and lower parts of the inner front-side vertical frame member of the side panel 5 and the pillar member 23 installed on the back side of the front panel 3a (see FIG. 9 and FIG. 10).

As shown in FIG. 3, hinges 25 include a first hinge 25a that is attached to the side panel (see side panel 7) and a second hinge 25b that is attached to the front panel 3a. Those hinges are provided at two locations: the upper part and the lower part of each panel. The upper first hinge 25a has an axial pin and the lower first hinge 25a has a cylindrical portion. And, both upper and lower second hinges 25b have cylindrical portions.

In the hinges 25, by inserting the upper second hinge 25b into the upper first hinge 25a and by inserting axial pins 26 into the lower first hinge 25a and the cylindrical portion of the second hinges 25b, the side panel 5 and the front panel 3a can be rotatably connected. Furthermore, when removing the front panel from the side panel, first the axial pin 26 can be removed, and while lifting the front panel 3a, the cylindrical portion of the second hinge 25b can be removed from the axial pin of the upper first hinge 25a.

Figure 9:
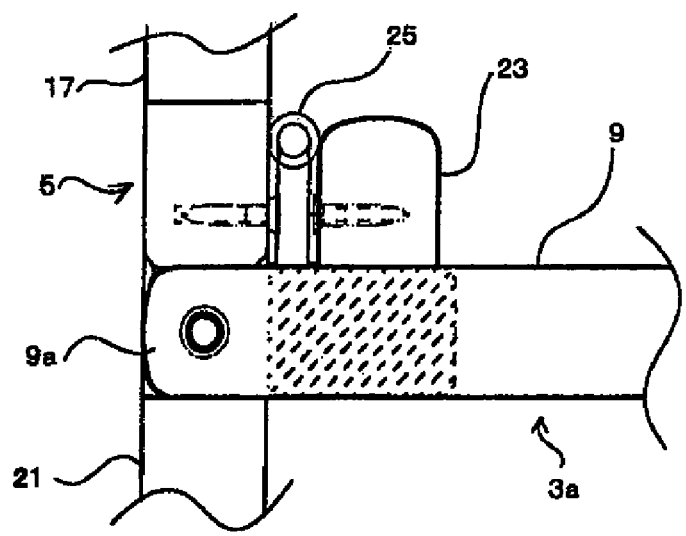
FIG. 9 is an enlarged view of portion A which is circled in FIG. 5.
Figure 11:
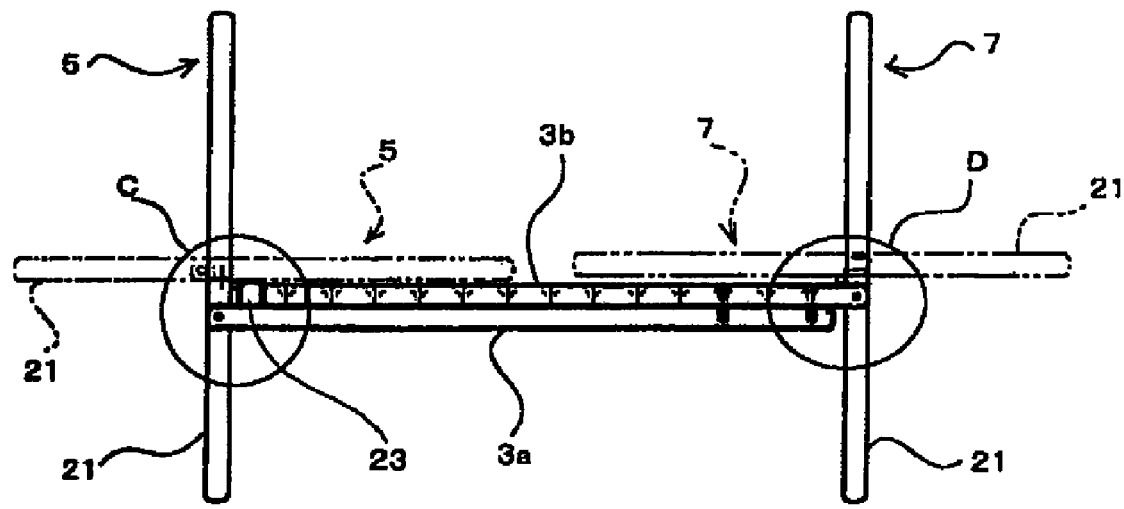
FIG. 11 is an explanatory drawings that illustrates the operation of an embodiment.
Figure 12:
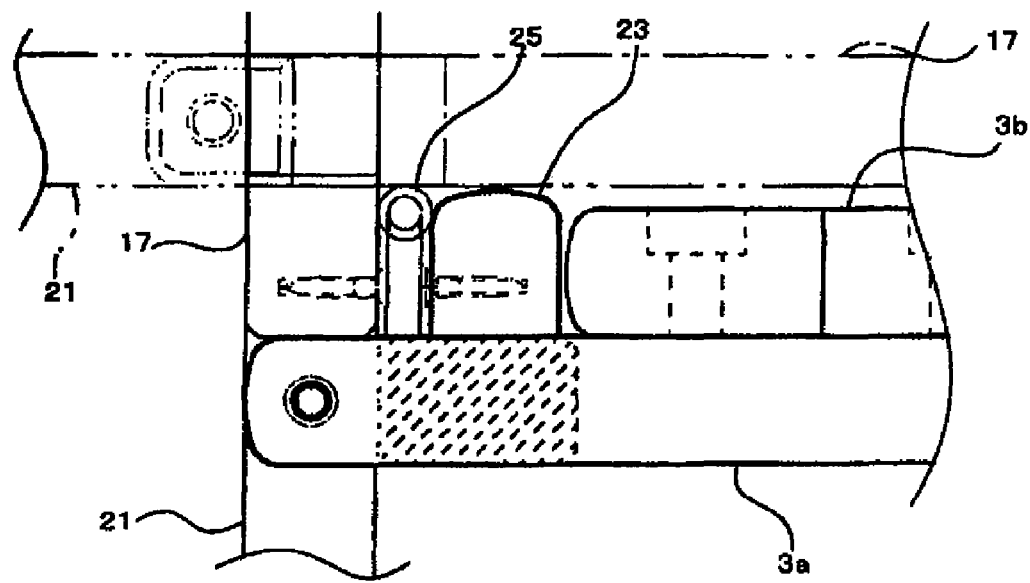
FIG. 12 is an enlarged view of portion C which is circled in FIG. 11.

The pillar member 23 installed on the back side of the front panel 3a is as thick as the front panel 3b which is posteriorly located. And, as shown in FIG. 9 and FIG. 12, the rotation center of the hinges 25 is located at the posterior side of the pillar member 23. As shown in FIG. 11 and FIG. 12, this structure creates a clearance, which is equivalent to the thickness of the pillar member 23, between the side panel 5 and the front panel 3a when the side panel 5 is folded. The posteriorly located front panel 3b can be inserted into the clearance, thereby making the freestanding pet barrier compact when it is folded.

Figure 10:
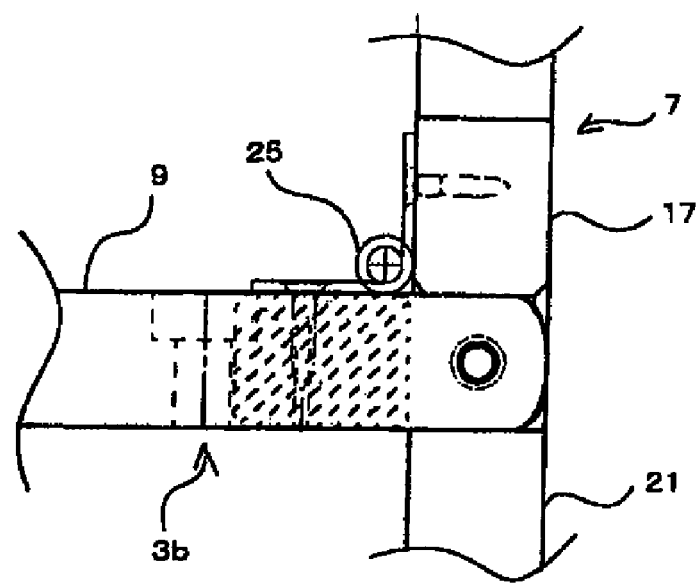
FIG. 10 is an enlarged view of portion B which is circled in FIG. 5.
Figure 13:
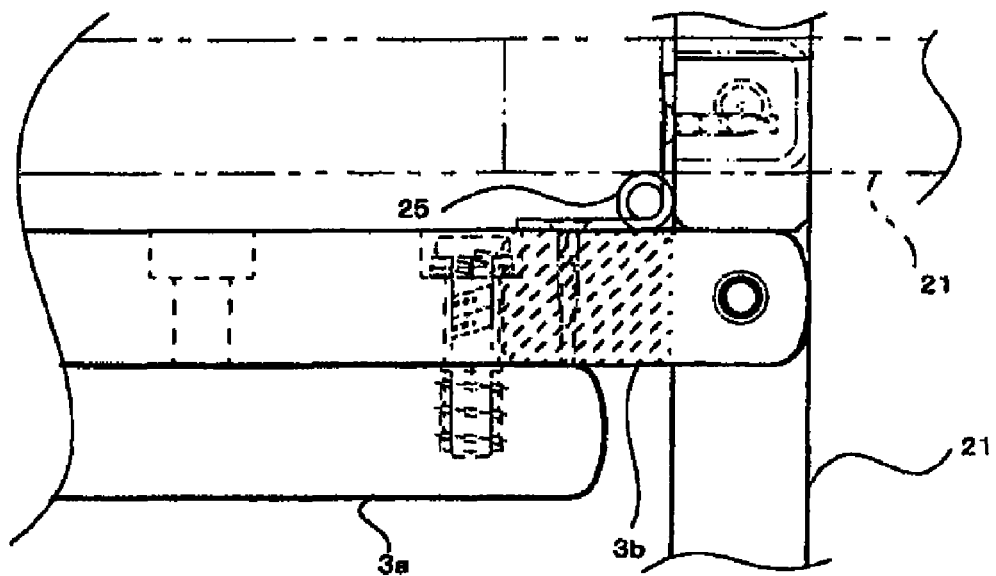
FIG. 13 is an enlarged view of portion D which is circled in FIG. 11

A pillar member is not provided on the side panel 7. As shown in FIGS. 5, 10 and 13, the side panel 7 is rotatably mounted to the front panel 3b by the hinges 25 provided on the side panel 7 and the frame 9 of the front panel 3b.

When the pet freestanding pet barrier is folded, the two side panels 5 and 7 form an almost flat plane as shown in the chain double-dotted line in FIG. 11, thereby facilitating the storage.

In one embodiment, when the freestanding pet barrier 1 is installed (see FIG. 1), by inserting a pin 27 into the frame 17 of the side panels 5 and 7 from the extending section 9a of the frame 9 of the front panel 3, it is possible to prevent the side panels 5 and 7 from rotating. That is, the pin 27 functions as a stopper according to an embodiment of the present invention.

A freestanding pet barrier 1 according to this embodiment, which is structured as stated above, can be installed at any indoor location in a generally letter-H configuration as shown in FIG. 1. Since the freestanding pet barrier 1 is self-supporting, it can be installed at a location where there are no walls or pillars on two sides, such as at the foot of a stair case. Furthermore, since side panels 5 and 7 are provided, it is possible to prevent a pet from entering from the direction of the sides of the front panel.

Figure 6:
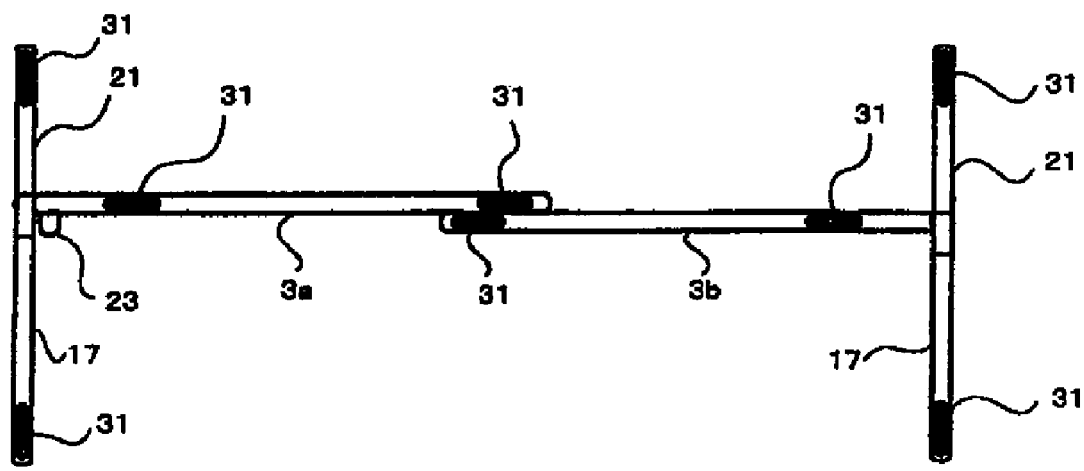
FIG. 6 is a bottom view of a freestanding pet barrier according to one embodiment of the present invention.

Furthermore, as shown in FIG. 6, a rubber friction increasing member 31 is attached to the bottom surface of the front panels 3a and 3b and the side panels 5 and 7. Therefore, the freestanding pet barrier which is not fixed to the wall or pillar is stable and will not slide.

Furthermore, since the height of the freestanding pet barrier 1 according to this embodiment is properly determined so that a person can step over the freestanding pet barrier, a person can simply step over when he or she goes through it without needing to perform any operation.

The width of the front panel 3 can be narrowed according to an installation location by simply increasing the length of the overlapping portion where the anteriorly located front panel 3a and the posteriorly located front panel 3b overlap, as shown in FIG. 2.

Furthermore, when the freestanding pet barrier is stored, it can be made compact by totally overlapping the front panels 3a and 3b, as shown in FIG. 11, and rotating the side panels 5 and 7 toward the front panel 3.

Moreover, as shown in FIG. 3, the front panels 3a and 3b and the side panels 5 and 7 can be separated from one another by simply removing the pins 26. Therefore, by disassembling the freestanding pet barrier, it can be made compact during transportation. It is also easy to assemble the pet fence.

As stated above, a freestanding pet barrier according to this embodiment makes it easy for a person to step over the freestanding pet barrier and facilitates the set-up of the freestanding pet barrier, and permits the freestanding pet barrier to be made more compact when it is stored.

Moreover, in the above embodiment, both the front panel 3 and the side panels 5 and 7 comprise a frame and wires. However, the front panel 3 and the side panels 5 and 7 can be made of wood or other board material.

Furthermore, the front panel is not intended to be limited to be a flat plane, and it can curve horizontally or vertically.

Moreover as a mechanism to adjust the width of the two front panels 3a and 3b, it is also possible to provide a long hole on either panel and fix the two panels at any position via a screw that passes through the long hole.

Figure 14:
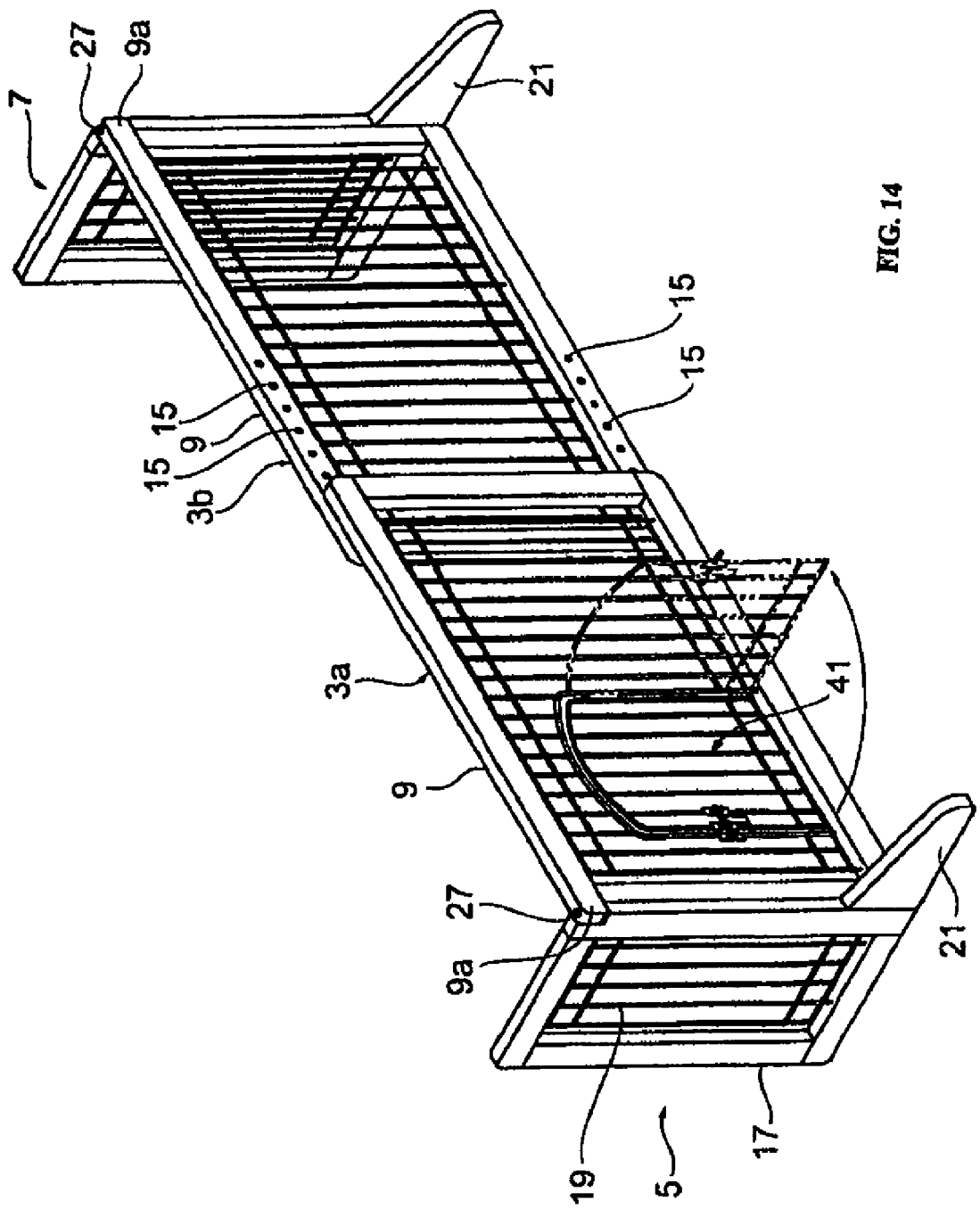
FIG. 14 is an explanatory drawing that illustrates another example of the freestanding pet barrier according to an embodiment of the present invention.

Moreover, as shown in FIG. 14, a small gate 41 may be provided on part of the front panel 3a to allow a pet to pass through the panel.

Providing the small gate 41 enables a pet to pass through the installed freestanding pet barrier, thereby allowing or preventing a pet from passing through to the other side of the freestanding pet barrier as necessary, which provides convenience for the pet owner.

Figure 15:
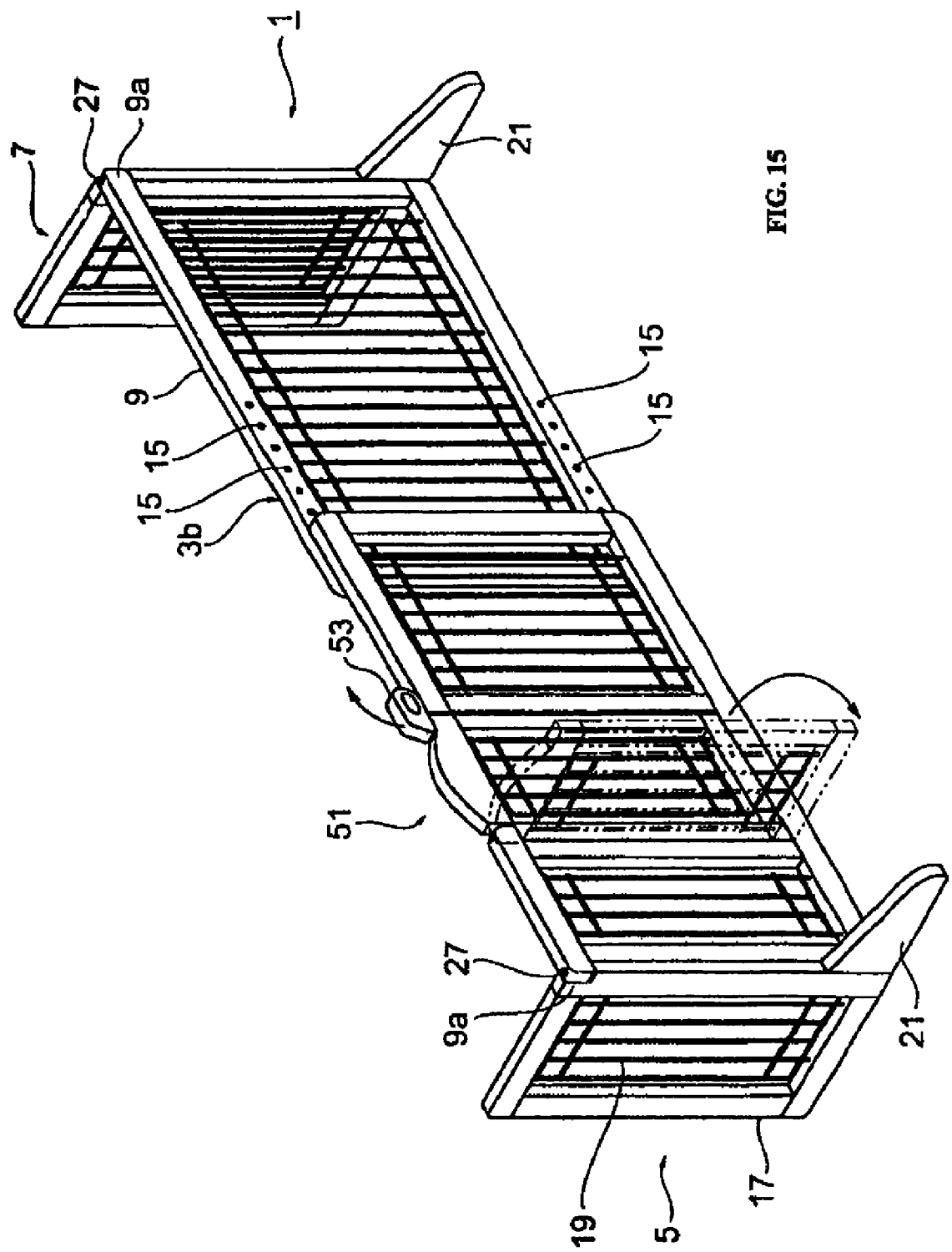
FIG. 15 is an explanatory drawing that illustrates another example of the freestanding pet barrier according to an embodiment of the present invention.

Furthermore, as shown in FIG. 15, the front panel 51 may have a gate that can be opened and closed when a person goes through it. The gate can be opened by rotating the handle 53 in the direction indicated by the arrow in the drawing.

Because the front panel has a gate which a person can open and close when he or she goes through, the person can pass through the panel even when it is too high to step over, thereby making it possible for a child or a physically impaired person who cannot step over the front panel to pass through the panel.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

We claim:

1. A self-supporting pet barrier, comprising:
a front barrier comprising a circumferential frame defining an open space interrupted by substantially vertical members with only the substantially vertical members in a central three-fifths portion of the open space, wherein the open space is further interrupted by at least one substantially horizontal member in a bottom or top one-fifth of the open space;
a first side barrier configured to be rotatably coupled to the front barrier at one of a plurality of angles;
a second side barrier configured to be rotatably coupled to the front barrier at one of a plurality of angles; and
the front barrier, the first side barrier, and the second side barrier are configured to be coupled together to form an open configuration to stabilize the self-supporting pet barrier without securing the pet barrier to a structure external to the self-supporting pet barrier, wherein a plan view of the front barrier, the first side barrier, and the second side barrier in the open configuration defines a non-enclosing figure.

2. The self-supporting pet barrier of claim 1, wherein the open space is interrupted by a substantially horizontal member in both the bottom and top one-fifth of the open space.

3. The self-supporting pet barrier of claim 2, wherein the substantially horizontal members and the substantially vertical members are wires.

4. The self-supporting pet barrier of claim 1, wherein the front barrier has a height of 65 cm or less.

5. The self-supporting pet barrier of claim 1, further comprising:
at least one leg coupled to one of the front barrier, the first side barrier, and the second side barrier and configured to assist with maintaining the self-supporting pet barrier to stand upright in use but is not configured to obstruct a path of a house pet, wherein the front barrier has a first side and a second side, wherein the first side barrier and the second side barrier are configured to extend beyond the front barrier on the first side of the front barrier in the open configuration and the at least one leg is configured to extend beyond the front barrier on the second side of the front barrier in the open configuration.

6. The self-supporting pet barrier of claim 1, further comprising:
a gate formed in the front barrier and attached thereto by at least one hinge and a lock, wherein the gate is configured to rotate on the at least one hinge upon release of the lock so that a pet can pass through the gate.

7. The self-supporting pet barrier of claim 1, further comprising:
a second front barrier,
wherein the first side barrier is configured to be coupled to a portion of the front barrier, wherein the second side barrier is configured to be coupled to a portion of the second front barrier, and wherein the second front barrier is configured to be coupled to the front barrier such that a distance between the portion of the front barrier and the portion of the second front barrier is adjustable.

8. A self-supporting pet barrier, comprising:
a first front barrier comprising a circumferential frame;
a second front barrier comprising a circumferential frame;
a first side barrier, the first side barrier configured to be rotatably coupled to a first portion of the first front barrier at one of a plurality of angles;
a second side barrier, the second side barrier configured to be rotatably coupled to a second portion of the second front barrier at one of a plurality of angles;
the first front barrier configured to be coupled to the second front barrier to allow adjustment of an extent to which the first front barrier and the second front barrier overlap such that a distance between the first portion of the first front barrier and the second portion of the second front barrier is adjustable;
the first and second front barriers and the first and second side barriers are configured to be coupled together in an open configuration in use to stabilize the self-supporting pet barrier without securing the self-supporting pet barrier to a structure external to the self-supporting pet barrier, wherein a plan view of the first front barrier, the second front barrier, the first side barrier, and the second side barrier in the open configuration defines a non-enclosing figure.

9. The self-supporting pet barrier according to claim 8, wherein the distance between the first portion of the first front barrier and the second portion of the second front barrier is configured to be adjustable in steps with physical features of the first and second front barriers.

10. The self-supporting pet barrier according to claim 8, further comprising:
a leg directly connected to only one of the first front barrier, the second front barrier, the first side barrier, and the second side barrier and configured to assist with maintaining the self-supporting pet barrier to stand upright in use but is not configured to obstruct a path of a house pet.

11. The self-supporting pet barrier according to claim 8, wherein the circumferential frames of the first and second front barriers define open spaces interrupted by substantially vertical members, wherein the open space of one of the first and second front barriers is further interrupted by a horizontal member in a bottom or top one fifth of the open space of the one of the first and second front barriers.

12. The self-supporting pet barrier according to claim 11, wherein the open spaces of the first and second front barriers are further interrupted by substantially horizontal members in only a bottom or top one-fifth of the open spaces.

13. The self-supporting pet barrier according to claim 8, wherein at least one of the first front barrier, the second front barrier, the first side barrier, and the second side barrier have a height of 65 cm or less.

14. A self-supporting pet barrier, comprising:
a front barrier comprising a circumferential frame;
a first side barrier configured to be rotatably coupled to the front barrier at one of a plurality of angles;
a second side barrier configured to be rotatably coupled to the front barrier at one of a plurality of angles; and
a gate formed in the front barrier, wherein the gate is configured to open so that a pet can pass through the gate;
the front barrier, the first side barrier, and the second side barrier are configured to be coupled together to form an open configuration to stabilize the self-supporting pet barrier without securing the pet barrier to a structure external to the barrier, wherein a plan view of the front barrier, the first side barrier, and the second side barrier in the open configuration defines a non-enclosing figure.

15. The self-supporting pet barrier according to claim 14, further comprising:
at least one leg coupled to one of the front barrier, the first side barrier, and the second side barrier and configured to assist with maintaining the self-supporting pet barrier to stand upright in use but is not configured to obstruct a path of a house pet, wherein the leg extends from the front barrier.

16. The self-supporting pet barrier according to claim 14, wherein the front barrier comprises a first front barrier and a second front barrier, the first front barrier configured to be coupled to the second front barrier such that a total width of the first and second front barriers is adjustable.

17. The self-supporting pet barrier according to claim 14, wherein the circumferential frame defines an open space that is interrupted by substantially vertical members with only the substantially vertical members in a central three-fifths portion of the open space, wherein the open space is further interrupted by a substantially horizontal member in a bottom or top one-fifth of the open space.

18. The self-supporting pet barrier according to claim 17, wherein the frame is substantially rectangular.

19. The self-supporting pet barrier according to claim 14, wherein the front barrier has a height of 65 cm or less.

20. The self-supporting pet barrier according to claim 14, wherein the gate is configured to open to permit a person to pass through the front barrier without having to step over the self-supporting pet barrier.

* * * * *